Feb. 4, 1936.   W. PINCIN   2,029,940
MICROMETER
Filed Aug. 11, 1933
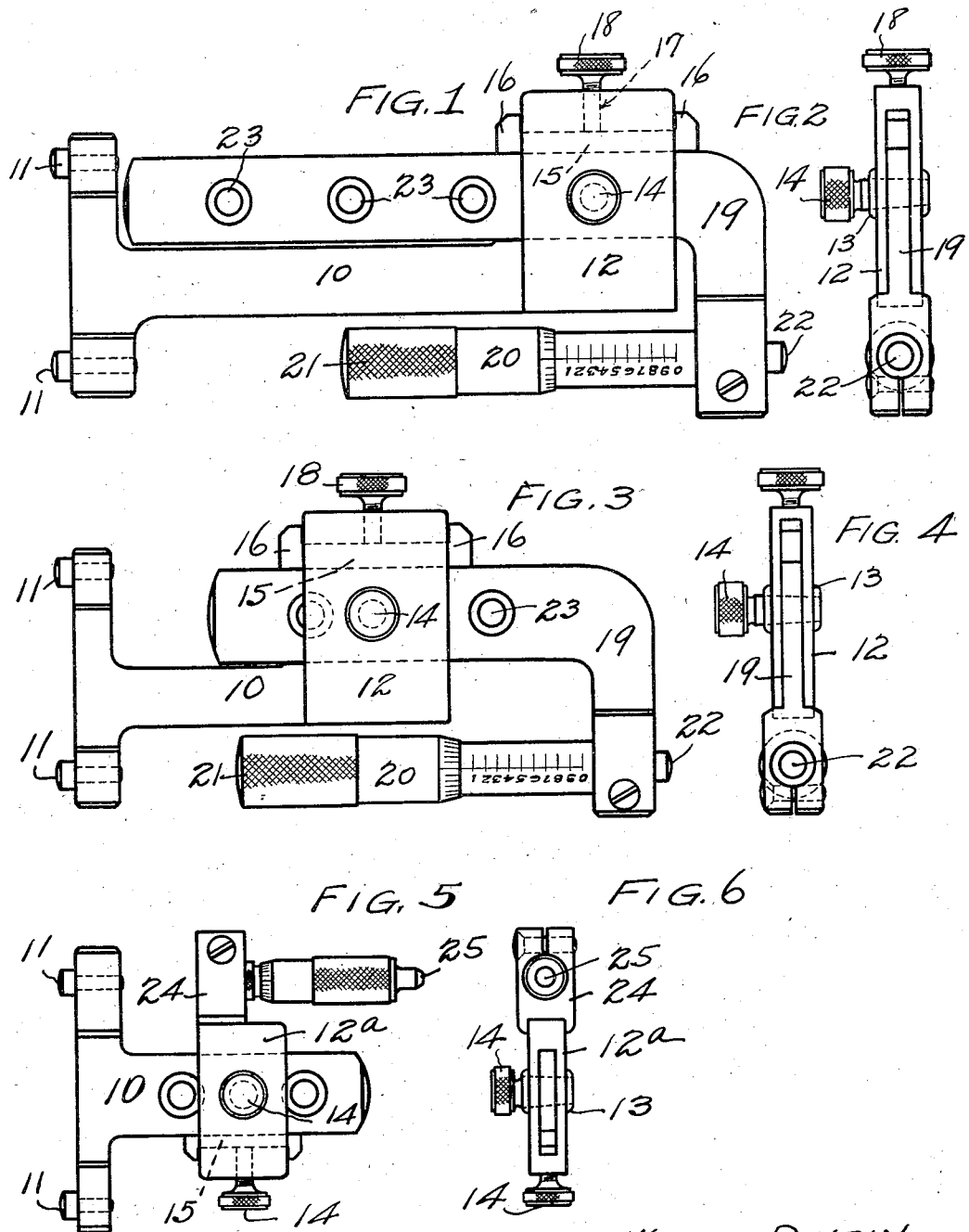
WILLIAM PINCIN
INVENTOR
BY N. E. Gee
ATTORNEY Patented Feb. 4, 1936

2,029,940

UNITED STATES PATENT OFFICE 2,029,940

MICROMETER

William Pincin, Altoona, Pa.

Application August 11, 1933, Serial No. 684,716

3 Claims. (Cl. 33—165)

This invention relates to measuring devices and has for its primary object an improved type of inside micrometer and height gauge, adapted for the use of automobile mechanics and machinists.

Another object of this invention, is to provide a micrometer that is susceptible of being manufactured in different sizes for gauging automobile cylinders, truck cylinders, heavy gas-engine cylinders, as well as steam-engine cylinders of large diameters.

A further object of this invention is to provide an improved micrometer that can readily be placed within the walls of an automobile cylinder; the cylinder engaged in three places and the exact diameter at any place readily obtained.

A still further object of this invention is to provide a micrometer frame of light non-corrosive material that will permit of long usage without becoming rust laden and inaccurate.

With these and many other objects in view, which will become more readily apparent as the nature of the invention is better understood, the same consists in the novel construction, combination and arrangement of parts as will be hereinafter fully pointed out, illustrated and claimed.

It will be quite readily understood by those skilled in the art to which this invention belongs, that the same is susceptible to some structural changes and modifications without departing from the spirit or scope of the invention, but a preferred and thoroughly practical embodiment of the invention is shown in the accompanying drawing, in which:

Fig. 1 shows the plan view of one of my improved micrometers made to measure cylinders which range in sizes from 6 inches to 10 inches, the measuring means being generally known as a one-inch micrometer head.

Fig. 2 is an edge view of the micrometer and frame shown in Fig. 1 of the drawing.

Fig. 3 shows a plan view of one of my improved micrometers made to measure cylinders that range in sizes, from 4 inches to 6½ inches. This micrometer is used for measuring track cylinders. The measuring device is, likewise, known as a one-inch micrometer head.

Fig. 4 is an edge view of the parts shown in Fig. 3 of the drawing.

Fig. 5 shows a plan view of one of my improved micrometers made up to gauge automobile cylinders which range in sizes from 2½ inches to 4 inches in diameter. The measuring device used in this gauge is known as a ½" micrometer head.

Similar reference numerals refer to similar parts throughout the several figures of the drawing.

In carrying out this invention, I provide a T-shaped frame designated by the numeral 10; the top of the T-shaped frame being provided with two hardened points 11, which are in exact alignment with each other and at right angles to the stem of the T-shaped frame.

The foot of the frame 10 is provided with a yoke 12, securely attached thereto, and positioned at right angles to the longitudinal center line of the T-shaped frame 10. The yoke 12 is provided with a perforation in the center into which is pressed a hardened steel bushing 13 from either side. The bushings 13 are each provided with a tapered inside diameter opening into which there is accurately fitted a tapered pin 14. The yoke 12 is further provided with a slidable block 15. The block 15 is provided with a plurality of upstanding shoulders 16, between the faces of each of which slidably fits the yoke 12. The yoke 12 is further provided with a threaded opening 17, into which is screwed a thumbscrew 18, which, when rotated, pushes the block 15 down in alignment with the yoke 12 as indicated in Fig. 1 of the drawing. The yoke 12 carries an L-shaped frame, designated by the numeral 19, which is first pinned to the yoke 12 and further secured in position with reference to the frame 10, through the medium of the block 15. The foot of the L-shaped frame 19 is provided with means for rotatably carrying the measuring head, designated in its entirety by the numeral 20. Rotation of the knurled portion 21 of the measuring head 20 either advances or retracts the micrometer pin 22, depending upon the direction of rotation.

The L-shaped frame 19 is further provided with a plurality of hardened steel bushings 23, each of which is engaged by the tapered pin 14, when successive larger diameters of cylinders are measured.

Fig. 5 shows a modification in the construction of this improved measuring device in that the L-shaped frame is not used and the micrometer head is carried by an extension 24, made as an integral part of the yoke 12ª. This construction eliminates one piece on the smaller sizes as will be readily observed from a comparative view of Figs. 1 and 5 of the drawing.

Having thus described the method of construction, I will now proceed with instructions as to how this improved micrometer is used by the automobile mechanic.

First an automobile cylinder is selected to be measured and if its approximate diameter is known to be between 2½" and 3½", the yoke 12 is positioned on the stem of the T-shaped frame and the pin 14 is dropped through the central opening as indicated in Fig. 5 of the drawing. The block 15 is then forced down on the stem 10 and the yoke 12ª locked in position on the stem. The micrometer is then placed in the cylinder with the hardened points 11 vertically aligned and impinging against the cylinder wall on one side and the micrometer pin 25 is advanced toward the opposite wall of the cylinder until the opposite wall is engaged, at which time the micrometer reading is taken; this being the exact diameter of the cylinder at that point. The micrometer is then placed in different positions within the cylinder in order to learn if the cylinder has been worn out of a true circle and, if so, how much.

The cylinder wall is thus intended to be engaged by the gauge at three points, namely by the fixed points 11—11 and the adjustable gauge end 25 of the micrometer. By sliding or moving the device vertically, that is longitudinally of the cylinder, an accurate measurement can be taken because the points 11—11 provide in effect the fixed base of a triangle which may always engage one side of the cylinder while the adjustable pin 25 constitutes the apex of the triangle. With the arrangement described, it is impossible to tilt the device in the plane of the triangle thus formed, thereby eliminating the so-called personal touch or feel required in connection with micrometers which do not have spaced fixed bearing points, but must be tilted about the relative fixed point as a fulcrum while the relatively adjustable gauge end is contacting with the opposite side of the cylinder. This same procedure is followed when using the gauge device in cylinders of large or small diameter.

When either of these micrometers is used as a height-gauge, the base pins 11 are placed upon a horizontal face; the micrometer occupying a position in a vertical plane, and the micrometer pin is advanced toward the object to be measured until the pin 22 engages the object, at which time the micrometer, giving the exact height, is read.

Having thus described my invention, what I claim and desire to protect by Letters Patent is:

1. An inside cylinder micrometer comprising an inverted T-shaped base provided with two aligned hardened steel points for engaging one of the cylinder walls; a yoke; means for securing the yoke to the T-shaped frame; a micrometer head carried by the said yoke; means for advancing the point of the micrometer until the opposite cylinder wall is engaged; means for reading the exact diameter of the cylinder and means for retracting the micrometer point.

2. An inside micrometer gauge comprising a T-shaped frame including a head and a shank portion, spaced contact members carried by the outer side of the head of said frame, a member slidably supported on the shank of said frame, means for locking said member in a selected position with reference to the said shank, and a micrometer mounted on said slidable member and having its head disposed inwardly toward the head of the frame and its gauge-pin contact disposed outwardly.

3. An inside micrometer gauge comprising a T-shaped frame including a head and a shank portion, spaced contact members carried by the outer side of the head of said frame, a yoke carried by the shank portion of the frame, an adjustable member including a portion slidable in said yoke parallel with and at one side of the shank of the frame, said adjustable member including an angularly offset portion disposed across the end of the shank of the frame, and a micrometer gauge carried by the said offset portion and disposed parallel to the shank of the frame and lying at the side of the shank opposite the yoke, said gauge having its gauge pin contact disposed outwardly of the frame.

WILLIAM PINCIN.